United States Patent
Miyaguchi et al.

(10) Patent No.: US 6,373,147 B1
(45) Date of Patent: Apr. 16, 2002

(54) CONTROL APPARATUS OF OCCUPANT PROTECTION DEVICE

(75) Inventors: Koichi Miyaguchi; Yasumasa Kanameda; Joerg Heckel; Masami Okano, all of Tomioka (JP)

(73) Assignee: Airbag Systems Company LTD, Gunma (JP)

( * ) Notice: Subject to any disclaimer, the term of this patent is extended or adjusted under 35 U.S.C. 154(b) by 0 days.

(21) Appl. No.: 09/492,305

(22) Filed: Jan. 27, 2000

(30) Foreign Application Priority Data

Feb. 15, 1999 (JP) .............................. 11-035400

(51) Int. Cl.[7] .............................................. B60R 21/32
(52) U.S. Cl. ..................... 307/10.1; 701/45; 340/436; 307/9.1
(58) Field of Search ................................ 307/10.1, 9.1; 324/207.11, 209.12; 701/45, 46, 47; 280/731, 732, 742, 735; 340/436; 180/232

(56) References Cited

U.S. PATENT DOCUMENTS

| 3,870,894 A | * | 3/1975 | Brede et al. ............... 307/9.1 |
| 5,809,439 A | * | 9/1998 | Damisch ...................... 701/45 |
| 6,125,313 A | * | 9/2000 | Watanabe et al. ............ 701/45 |

FOREIGN PATENT DOCUMENTS

JP          A885414       4/1996

* cited by examiner

*Primary Examiner*—Josie Ballato
*Assistant Examiner*—Robert L. Deberadinis
(74) *Attorney, Agent, or Firm*—Birch, Stewart, Kolasch & Birch, LLP

(57) ABSTRACT

A control apparatus of an occupant protection device has at least one front acceleration sensor provided in a front part of a vehicle, in addition to a room acceleration sensor provided in a room of the vehicle. Whether the vehicle is in a collision requiring a drive of the occupant protection device is decided based on each of sensor outputs of the room and front acceleration sensors, respectively, and the occupant protection device is driven when the collision is detected based on at least one of the sensor outputs. Since the front acceleration sensor is provided in the front part of the vehicle, the front acceleration sensor detects a collision acceleration early and gives it to the control unit, even in case of a collision, such as the offset or an oblique collision, in which a collision acceleration transmitted to the room acceleration sensor may be weakened. Therefore, the control unit can exactly drive the occupant protection device without causing delay in collision detection.

21 Claims, 7 Drawing Sheets

CONTROL APPARATUS OF OCCUPANT PROTECTION DEVICE

BACKGROUND OF THE INVENTION

The present invention relates to a control apparatus of an occupant protection device of a vehicle, such as an airbag and seat-belt tensioner.

A conventional control apparatus for controlling an occupant protection device, as shown in The Japanese Patent Laid Open Publication No.8-85414, for example, has an acceleration sensor provided on a floor tunnel in a car room. The acceleration sensor detects an acceleration operating to a car body through the floor tunnel, and gives an analog signal representative of the acceleration to the control apparatus. The control apparatus integrates the acceleration signal from the acceleration sensor, detects an occurrence of a collision requiring a drive of an occupant protection device based on a comparison between an integrated value of the acceleration signal and a predetermined collision decision threshold value, and drives the occupant protection device such as an airbag.

By the way, when an impact of collision is absorbed by a crush of a collision part of the car body, it can be assumed that a collision acceleration transmitted to the floor tunnel is weakened. In such a case, since an acceleration detected by the acceleration sensor provided on the floor tunnel is small, though there is no fear of it causing difficulties in occupant protection at time of collision, a fear of causing a delay in driving the occupant protection device exists. In particular, a collision, such as an offset collision or an oblique collision, tends to cause a case in which the acceleration transmitted to the floor tunnel is weakened. Because of this, from the viewpoint of improving a control of the occupant protection device, regardless of whether the collision acceleration transmitted to the acceleration sensor provided in the car room is weakened, an exact control of the occupant protection device is desired.

SUMMARY OF THE INVENTION

It is an object of the present invention to provide an improved control apparatus of an occupant protection device.

Another object of the present invention is to provide a control apparatus that can exactly control the occupant protection device, regardless of whether a collision acceleration transmitted to an acceleration sensor provided in a car room is weakened.

The above and other objects are attained by a control apparatus of an occupant protection device having a room acceleration sensor, provided in a room of a vehicle, for detecting an acceleration of the vehicle, comprising: at least one front acceleration sensor, provided in a front part of the vehicle, for detecting the acceleration of the vehicle; and a control unit, connected to said room acceleration sensor and said front acceleration sensor, for inputting sensor outputs of said room acceleration sensor and said front acceleration sensor, for deciding whether the vehicle is in a collision requiring a drive of the occupant protection device based on each of the sensor outputs of said room acceleration sensor and said front acceleration sensor, respectively, and for driving the occupant protection device when the collision is detected based on at least one of the sensor outputs.

According to a composition like this, whether the vehicle is in the collision requiring to drive of the occupant protection device is decided respectively based on each of the sensor outputs of the room and front acceleration sensors. When the collision is detected based on at least one of the sensor outputs, the occupant protection device, such as an airbag and a seat-belt tensioner, is driven. Since the front acceleration sensor is provided in the front part of the vehicle, the front acceleration sensor detects a collision acceleration early and gives it to the control unit, even in case of a collision, such as an offset or oblique collision, in which a collision acceleration transmitted to the room acceleration sensor provided in the room of the vehicle may be weakened. Therefore, the control unit can exactly drive the occupant protection device without causing delay in collision decision.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
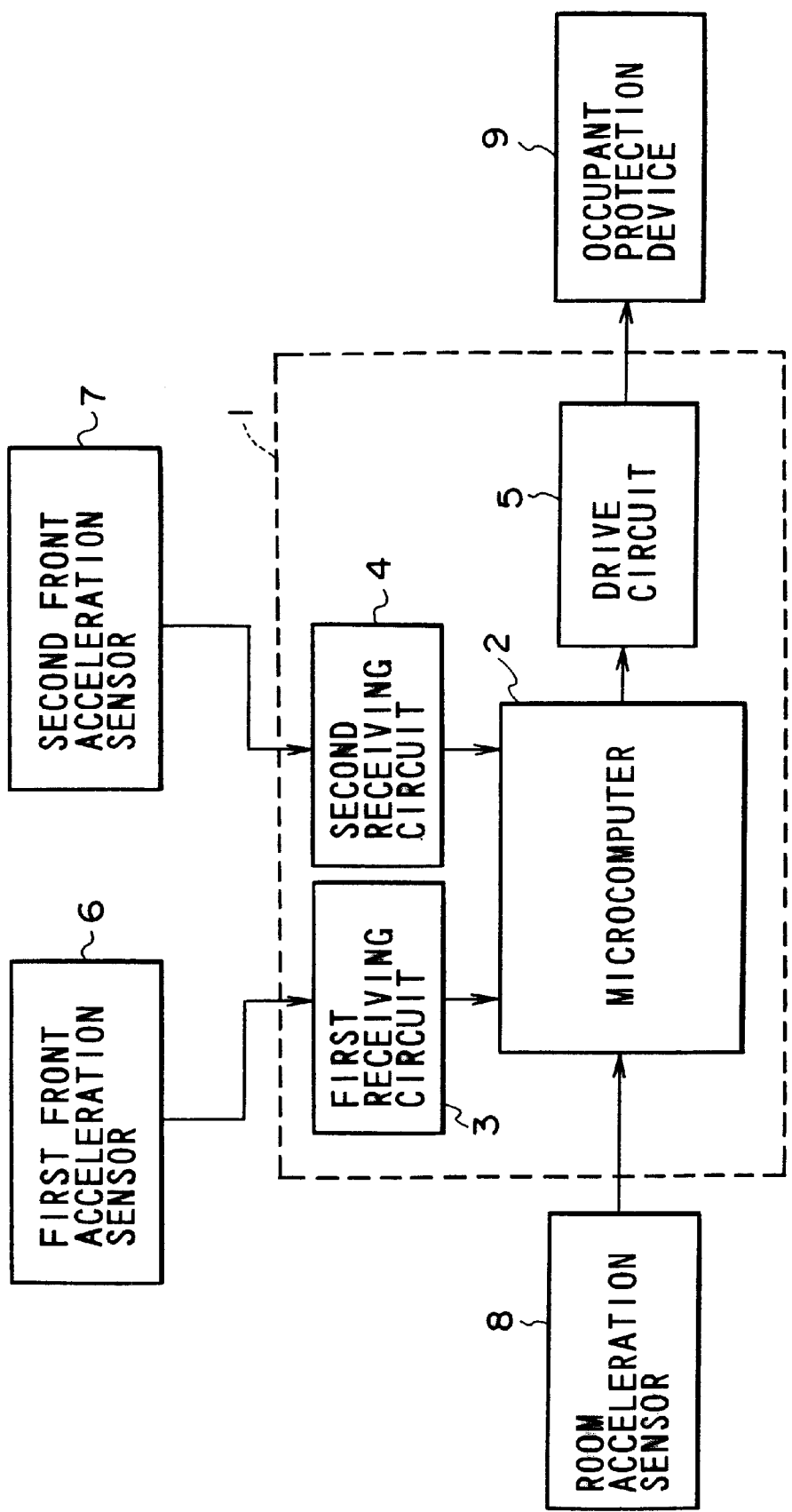
FIG. 1 is a block diagram showing an embodiment of the present invention.

In FIG. 1, a reference numeral 1 is a control unit. The control unit 1 has a microcomputer 2, first and second receiving circuits 3 and 4, and a drive circuit 5. The microcomputer 2 inputs sensor outputs of first and second front acceleration sensors 6 and 7 by way of the first and second receiving circuits 3 and 4, inputs a sensor output of a room acceleration sensor 8, and gives a collision detection signal to the drive circuit 5 based on the sensor outputs of the acceleration sensors 6-8. The drive circuit 5, when the collision detection signal is input, outputs a drive signal to an occupant protection device 9, and thereby the occupant protection device 9 is driven. The occupant protection device 9 concretely is an airbag or a seat-belt tensioner. The control unit 1 is provided on a floor tunnel in a car room.

The first and second front acceleration sensors 6 and 7 are provided at front parts of a vehicle, for example, at left and right ends of a radiator mount maintaining a radiator, respectively, so that the first and second front acceleration sensors 6 and 7 can detect a collision acceleration early in case of a collision, such as an offset collision and an oblique collision. Therefore, for example, the first front acceleration sensor 6 is positioned near a left fender of the front part of the vehicle, and the second front acceleration sensor 7 is positioned near a right fender of the front part of the vehicle. Since the first and second front acceleration sensors 6 and 7 have a temperature compensation function as described below, the front acceleration sensors 6 and 7 can be provided without requiring a consideration whether they are receive heat from an engine. The first and second front acceleration sensors 6 and 7 each have a circuit composition shown in FIG. 2.

Figure 2:
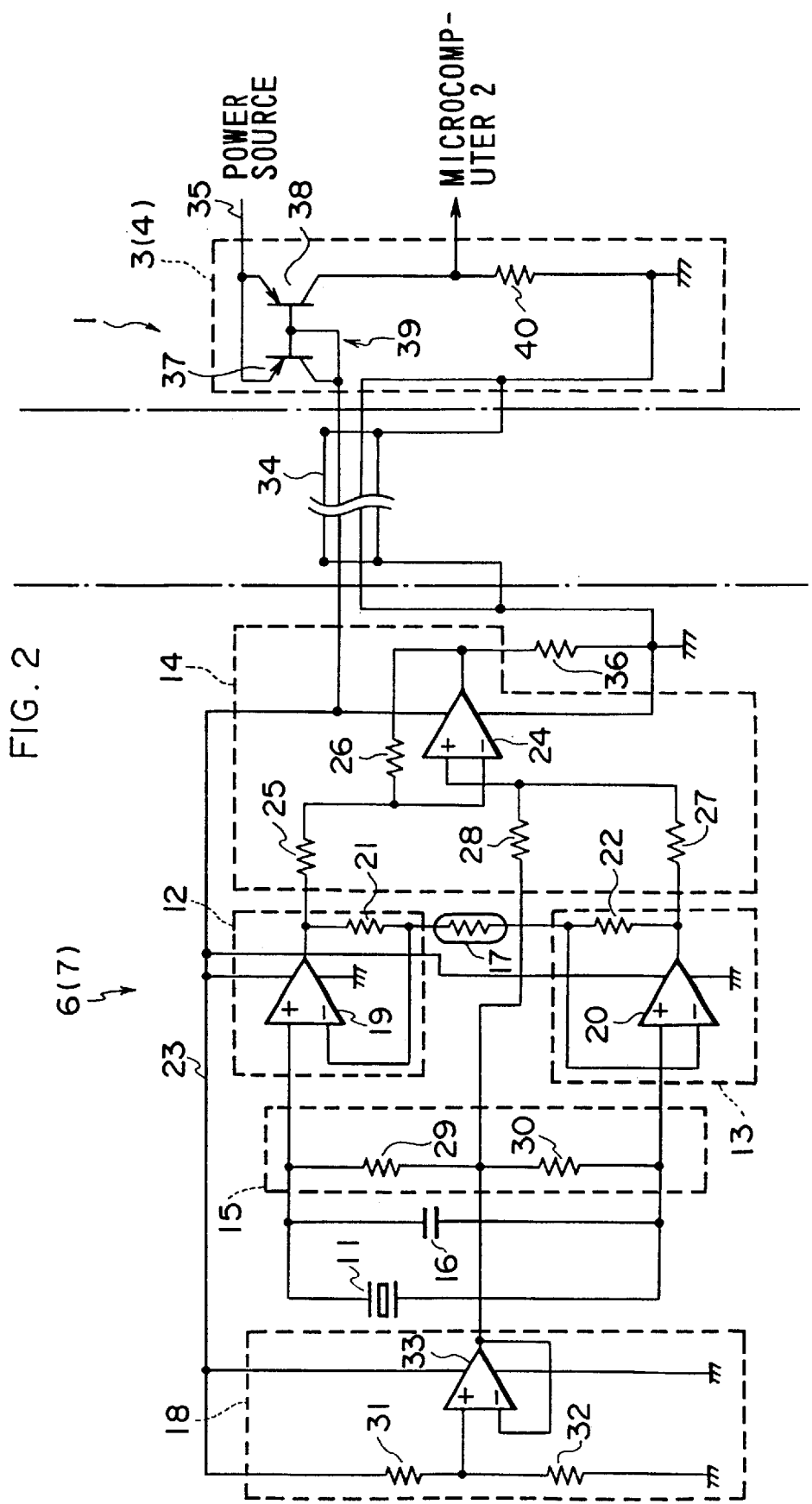
FIG. 2 is a circuit diagram showing an example of first and second front acceleration sensors and first and second receiving circuits of a control unit in FIG. 1.

FIG. 2 is a circuit diagram showing an example of the front acceleration sensors 6 and 7 and the receiving circuits 3 and 4 of the control unit 1 in FIG. 1.

The first (second) front acceleration sensor 6 (7) includes a piezo-electric element 11 for detecting an acceleration, an amplifier circuit having first and second non-inverting amplifier circuits 12 and 13 and a differential amplifier circuit 14, a bias resistor circuit 15, a condenser 16, a temperature compensation element 17 as temperature compensation means, and a reference voltage circuit 18.

The first non-inverting amplifier circuit 12 of the amplifier circuit has a bipolar transistor type operational amplifier 19 and a resistor 21 inserted between a negative input terminal and an output terminal of the operational amplifier 19. The second non-inverting amplifier circuit 13 of the amplifier circuit has a bipolar transistor type operational amplifier 20 and a resistor 22 inserted between a negative input terminal and an output terminal of the operational amplifier 20. An operating power source of the operational amplifiers 19 and 20 is supplied from a sensor power supply line 23. As described below, the control unit 1 supplies a predetermined constant voltage to the sensor power supply line 23 by way of the receiving circuit 3 (4). A positive input terminal of the operational amplifier 19 of the first non-inverting amplifier circuit 12 is connected to one end of the piezo-electric element 11, and a positive input terminal of the operational amplifier 20 of the second non-inverting amplifier circuit 13 is connected to the other end of the piezo-electric element 11. By this, voltage outputs at both ends of the piezo-electric element 11 are non-inversion amplified and converted to low impedances respectively by the first and second non-inverting amplifier circuits 12 and 13. Since the voltage outputs of the piezo-electric element 11 are lowered by a parallel insertion of the condenser 16 to the piezo-electric element 11 as described below, the resistors 21 and 22 of the first and second non-inverting amplifier circuits 12 and 13 are set to relatively high value so that decrement in the voltage outputs of the piezo-electric element 11 can be supplemented by gains of the operational amplifiers 19 and 20.

The differential amplifier circuit 14 of the amplifier circuit has a bipolar transistor type operational amplifier 24. An operating power source of the operational amplifier 24 is supplied from the sensor power supply line 23. A negative input terminal of the operational amplifier 24 is connected through a resistor 25 to the output terminal of the operational amplifier 19 of the first non-inverting amplifier circuit 12, and is also connected through a resistor 26 to an output terminal thereof. A positive input terminal of the operational amplifier 24 is connected through a resistor 27 to the output terminal of the operational amplifier 20 of the second non-inverting amplifier circuit 13, and also receives a reference potential from the reference voltage circuit 18 through a resistor 28. The differential amplifier circuit 14 differentially amplifies the outputs of the first and second non-inverting amplifier circuits 12 and 13, and outputs an acceleration signal as the sensor output. As described below, the reference potential given from the reference voltage circuit 18 to the differential amplifier circuit 14 is given by way of a reference voltage buffer amplifier 33 so as to match with output impedances of the first and second non-inverting amplifier circuits 12 and 13. By this, a common mode rejection ratio of the differential amplifier circuit 14 becomes large. Accordingly, an influence of offset voltage due to the gain increment of the first and second non-inverting amplifier circuits 12 and 13 is suppressed by the differential amplifier circuit 14.

The bias resistor circuit 15 has a bias resistor 29 inserted between the positive input terminal of the first non-inverting amplifier circuit 12 and the reference potential of the reference voltage circuit 18, and a bias resistor 30 inserted between the positive input terminal of the second non-inverting amplifier circuit 13 and the reference potential of the reference voltage circuit 18. The condenser 16 is inserted in parallel with the piezo-electric element 11 so that a composite capacity with the piezo-electric element 11 increases. By this, a lower cut-off frequency is lowered without increasing resistor values of the bias resistors 29 and 30. Since the control unit 1 performs a collision decision by converting the acceleration signals from the first and second front acceleration sensors 6 and 7 into velocities, it is necessary to give even a lower frequency in which velocity variations can be detected more easily. For example, it is desirable to give a frequency even below 10 Hz. Also, when the bias resistors 29 and 30 are set, for example, to high resistance values of about 100 MΩ in order to lower the lower cut-off frequency, it is not possible to use these resistors under a normal atmosphere. Further, when the bias resistor 29 and 30 are set to the high resistance values as mentioned above, a DC voltage maybe applied to the piezo-electric element 11 by influence of bias current, and thereby a migration may be caused in the piezo-electric element 11. Because of this, it is desirable to set the bias resistors 29 and 30 to about 1 MΩ. Since the lower cut-off frequency is determined by the composite capacity of the piezo-electric element 11 and the condenser 16 and the resistance values of the bias resistors 29 and 30, a capacity value of the condenser 16 is set so that the bias resistors 29 and 30 are about 1 MΩ, and furthermore, so that the lower cut-off frequency is a low value below 10Hz, for example. Although the voltage outputs of the piezo-electric element 11 are decreased by the parallel insertion of the condenser 16 to the piezo-electric element 11, this is supplemented by the gain increment of the first and second non-inverting amplifier circuits 12 and 13 as mentioned above. Also, since an output-temperature characteristic of the piezo-electric element 11 becomes apparent by the parallel insertion of the condenser 16, the temperature compensation element 17 is provided in order to compensate the output-temperature characteristic of the piezo-electric element 11. The output-temperature characteristic of the piezo-electric element 11 is a positive characteristic. Therefore, the outputs of the piezo-electric element 11 are increased when temperature rises, and are decreased when temperature drops.

The temperature compensation element 17 is inserted between the negative input terminal of the operational amplifier 19 of the first non-inverting amplifier circuit 12 and the negative input terminal of the operational amplifier 20 of the second non-inverting amplifier circuit 13. In this example, the temperature compensation element 17 is a posistor. The posistor 17 lowers the gains of the first and second non-inverting amplifier circuits 12 and 13 when temperature rises, and raises these gains when temperature drops. By this, the outputs of the piezo-electric element 11 is compensated against temperature variations. Since the gains of the first and second non-inverting amplifier circuits 12 and 13 are adjusted by a single temperature compensation element, decrement in number of elements and simplification of circuit composition can be achieved.

The reference voltage circuit 18 has a series connection of voltage dividing resistors 31 and 32 inserted between the sensor power supply line 23 and the ground, and the reference voltage buffer amplifier 33 composed of a bipolar transistor type operational amplifier. The buffer amplifier 33 receives a voltage divided by the voltage dividing resistors 31 and 32 as a positive input, and a negative input terminal is connected to its output terminal. The reference voltage circuit 18 gives the reference potential to the differential amplifier circuit 14 and the bias resistor circuit 15 by way of the buffer amplifier 33. Thus, matching with the output impedances of the first and second non-inverting amplifier circuits 12 and 13 can be attained, and thereby the common mode rejection ratio of the differential amplifier circuit 14 is increased. An operating power source of the reference voltage buffer amplifier 33 is supplied from the sensor power supply line 23. Since the sensor outputs of the first and second front acceleration sensors 6 and 7 are transmitted as current variations in the sensor power supply line 23 to the control unit 1 as described below, the voltage dividing resistors 31 and 32 are set to relatively high values of some KΩ so that a current flowing through the resistors 31 and 32 to the ground becomes small. Incidentally, in this example the reference potential is given to the bias resistor circuit 15 by way of the reference voltage buffer amplifier 33, but it is also acceptable to directly give the divided voltage of the resistors 31 and 32 to the bias resistor circuit 15.

The sensor power supply line 23 of the first (second) front acceleration sensor 6 (7) is connected to the first (second) receiving circuit 3 (4) of the control unit 1 by way of a transmission cable 34, and receives a predetermined constant voltage from a unit power supply line 35 in the control unit 1 by way of the first (second) receiving circuit 3 (4). In this example, from the viewpoint of noise prevention, a twisted pair cable is used as the transmission cable 34. The output terminal of the operational amplifier 24 of the differential amplifier circuit 14 which gives the sensor output of the front acceleration sensor 6 (7) is grounded through an output resistor 36, and thereby the sensor output is given as current variations in the sensor power supply line 23 to the receiving circuit 3 (4) by way of the twisted pair cable 34. Incidentally, since the operational amplifiers 19, 20, 24 and 33 in the front acceleration sensor 6 (7) operate with nearly a constant current, the operating current of the operational amplifiers 19, 20, 24 and 33 does not affect the sensor output given as current variations.

The first (second) receiving circuit 3 (4) of the control unit 1 has a current mirror circuit 39 having a pair of transistors 37 and 38, and a detection resistor 40. One transistor 37 of the current mirror circuit 39 at its emitter is connected to the unit power supply line 35, at its collector is connected to the sensor power supply line 23 by way of the twisted pair cable 34, and at its base is connected to the collector and a base of the other transistor 38. The other transistor 38 at its emitter is connected to the unit power supply line 35, and at its collector is grounded through the detection resistor 40. The sensor output from the front acceleration sensor 6 (7) is given as a voltage signal to the microcomputer 2 by the detection resistor 40.

In the circuit of FIG. 2, when the piezo-electric element 11 does not detect any acceleration, the differential amplifier circuit 14 gives a prescribed voltage output based on the reference potential of the reference voltage circuit 18, and thereby a prescribed current flows through the output resistor 36 to the ground. Accordingly, a certain current corresponding to the prescribed current which flows through the output resistor 36 of the front acceleration sensor 6 (7) is given to the unit power supply line 35 of the control unit 1 by way of the sensor power supply line 23 and the twisted pair cable 34. In the first (second) receiving circuit 3 (4), the pair of transistors 37 and 38 give a current to the detection resistor 40 based on base-emitter voltages according to the certain current flowing through the unit power supply line 35. Thus, a prescribed voltage signal indicating that no acceleration is detected is given by way of the detection resistor 40 to the microcomputer 2. The microcomputer 2 inputs the prescribed voltage signal by way of A/D conversion.

On the other hand, when the piezo-electric element 11 detects an acceleration, the voltage outputs of the both ends of the piezo-electric element 11 are non-inversion amplified by the first and second non-inverting amplifier circuits 12 and 13, respectively, and the non-inversion amplified outputs are differentially amplified by the differential amplifier circuit 14. By this, the differential amplifier circuit 14 gives a voltage output which varies according to the detected acceleration, and the voltage output is given as current variations to the unit power supply line 35 of the control unit 1 by way of the output resistor 36. In the receiving circuit 3 (4), a base-emitter voltage of one transistor 37 of the current mirror circuit 39 varies according to the current variations in the unit power supply line 35, that is, the sensor output of the front acceleration sensor 6 (7). By this, the other transistor 38 gives the detection resistor 40 a collector current so that a base-emitter voltage of the other transistor 38 is the same potential as the base-emitter voltage of one transistor 37. By this, the sensor output of the front acceleration sensor 6 (7) is given as a voltage signal by the detection resistor 40, and the microcomputer 2 inputs the voltage signal by way of A/D conversion. If the detection resistor 40 is set to the same resistance value as that of the output resistor 36 of the front acceleration sensor 6 (7), a voltage nearly the same as a voltage at both ends of the output resistor 36 is given from the detection resistor 40.

According to the composition of FIG. 2, the output fluctuations of the piezo-electric element 11 due to variations in ambient temperature are compensated by the gain adjustments of the first and second non-inverting amplifier circuits 12 and 13 by means of the temperature compensation element 17. Because of this, even when the front acceleration sensor 6 (7) is provided in a place with extreme ambient temperature variations such that it directly receives heat from the vehicle engine, the sensor output of the front acceleration sensor 6 (7) does not fluctuate by variations in ambient temperature.

Also, by inserting the condenser 16 in parallel with the piezo-electric element 11, the composite capacity is increased. By this, the lower cut-off frequency can be lowered without increasing the resistance values of the bias resistors 29 and 30. Because of this, the front acceleration sensor 6 (7) can output even a lower frequency, and thereby the sensor output that facilitates a collision decision can be given. Also, it is not necessary to set the bias resistors 29 and 30 to such high resistance values that cannot be used in an ordinary atmosphere. Further, the migration in the piezo-electric element 11, occurring by setting the bias resistors 29 and 30 to high resistance values, can be prevented.

Also, the sensor output of the front acceleration sensor 6 (7) is transmitted to the receiving circuit 3 (4) of the control unit 1 as current variations in the power supply lines 23, 34 and 35. Because of this, it is not necessary to provide a signal line. Also, since it is not necessary to use a ground potential by car body grounding as a reference, noise prevention can be done more effectively.

Further, the receiving circuit 3 (4) of the control unit 1 is formed with the current mirror circuit 39 comprising the transistors 37 and 38. Because of this, since temperature characteristics of the base-emitter voltages of the transistors 37 and 38 are cancelled, no temperature compensation means is required. Also, since the receiving circuit 3 (4) operates with a voltage supplied to the front acceleration sensor 6 (7), there is no need to prepare another operating voltage, and the composition of the receiving circuit 3 (4) can be simplified in the extreme.

Reverting to FIG. 1, the room acceleration sensor 8 is provided on the floor tunnel in the car room together with the control unit 1. The room acceleration sensor 8 detects an acceleration transmitted through the floor tunnel, and gives an acceleration signal to the microcomputer 2 of the control unit 1 as the sensor output. Since the room acceleration sensor 8 is provided on the floor tunnel in the car room, in case of a collision in which a collision acceleration transmitted to the floor tunnel is weakened because of an impact absorption by a crash of the car body, there is a fear that the collision acceleration detected by the room acceleration sensor 8 is small. However, in case of a collision, such as a head-on collision, in which the collision acceleration is easily transmitted to the floor tunnel, the collision acceleration can be detected early by the room acceleration sensor 8. As the room acceleration sensor 8, a well-known acceleration sensor can be used, or an acceleration sensor which is composed likewise the front acceleration sensor 6 (7) in FIG. 2 can be used.

The microcomputer 2 of the control unit 1 executes the following controls according to flow diagrams of FIG. 3, FIG. 4 and FIG. 5 as described below. The microcomputer 2 decides whether the vehicle is in a collision requiring the drive of the occupant protection device 9 based on the sensor output of the first front acceleration sensor 6, decides whether the vehicle is in the collision based on the sensor output of the second front acceleration sensor 7, and decides whether the vehicle is in the collision based on the sensor output of the room acceleration sensor 8. And, when the collision is detected based on at least one of the sensor outputs, the microcomputer 2 outputs the collision detection signal to the drive circuit 5.

Figure 3:
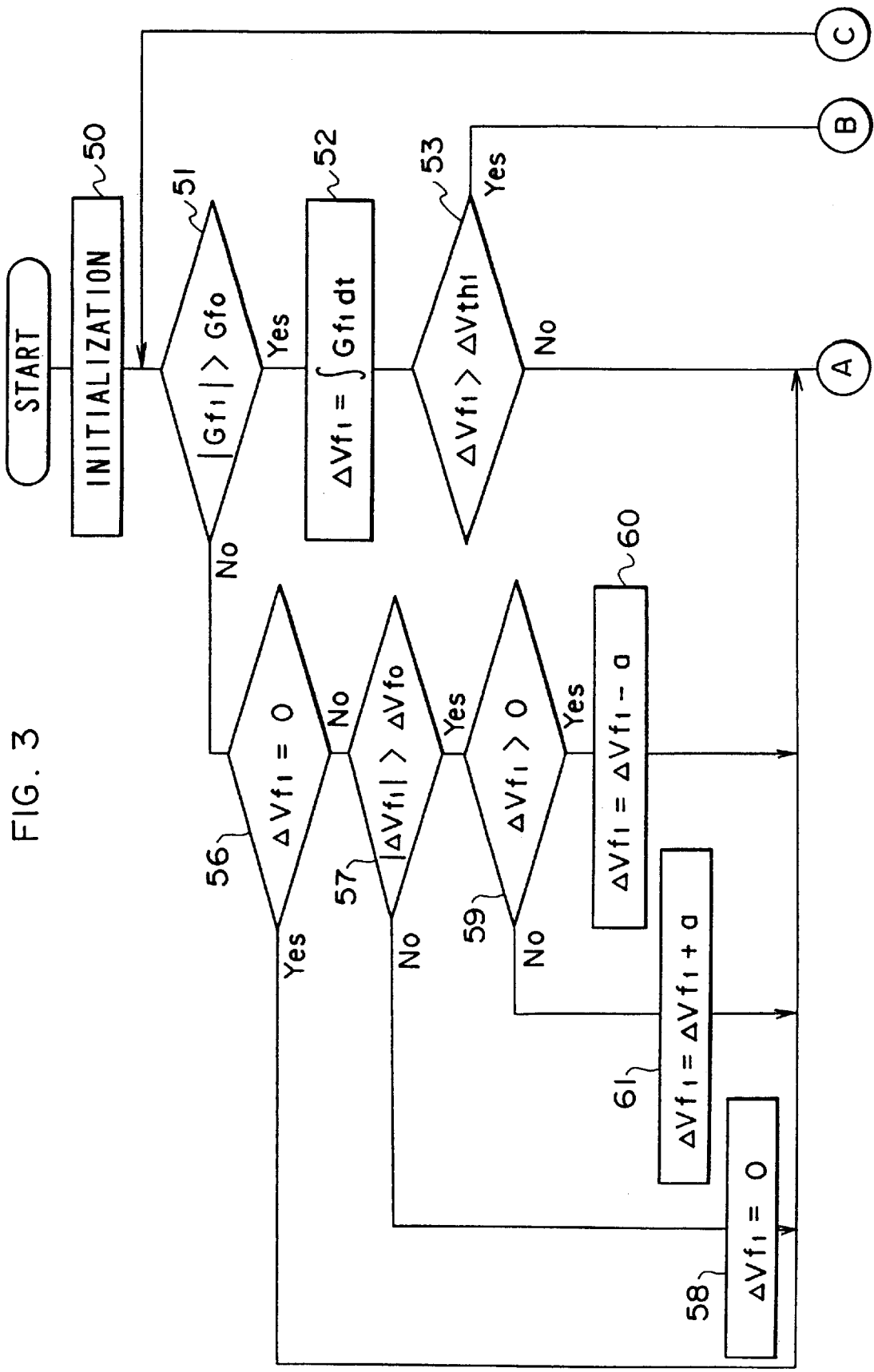
FIG. 3, FIG. 4 and FIG. 5 are flow diagrams of a microcomputer of the control unit in FIG. 1.
Figure 4:
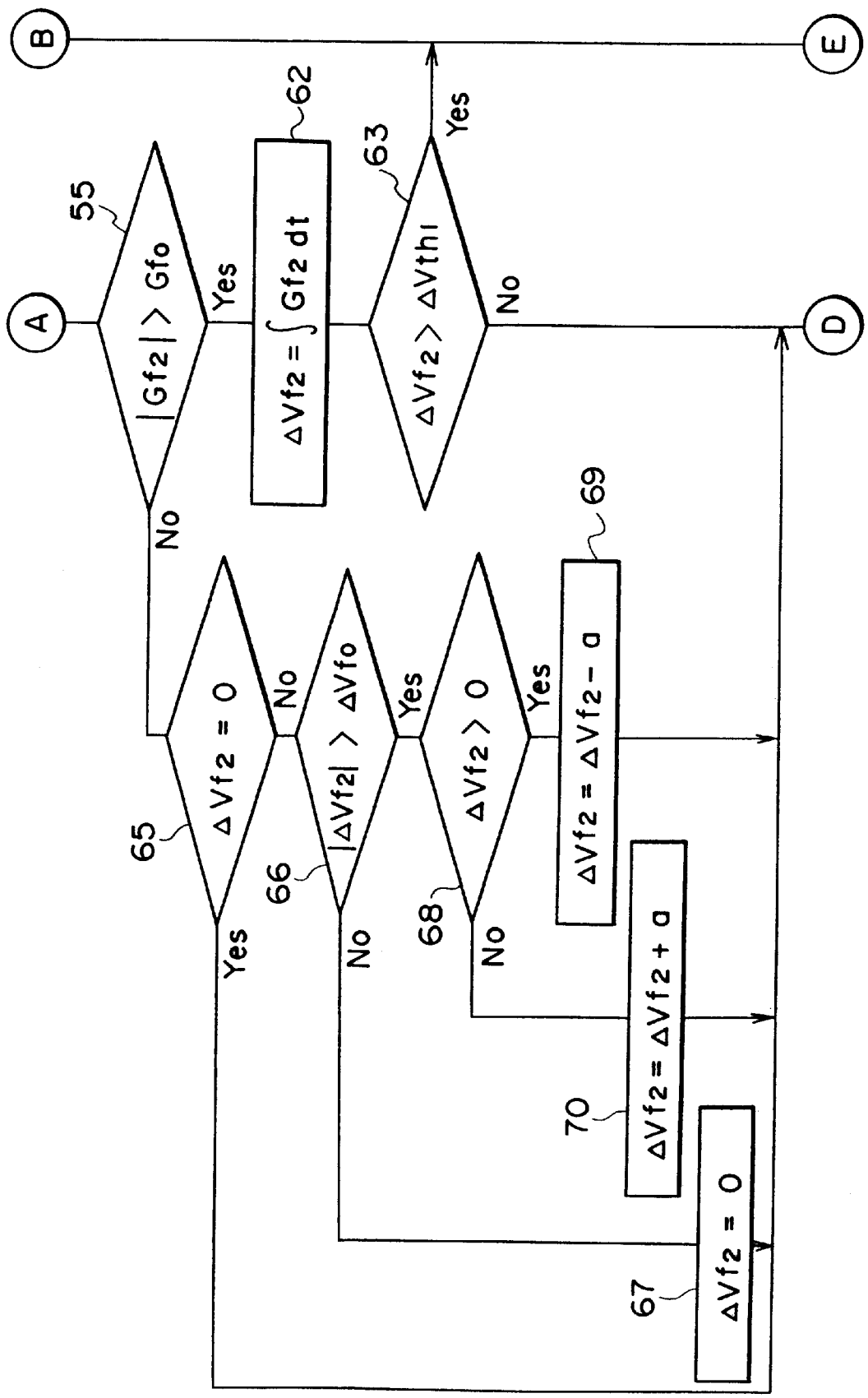
Figure 5:
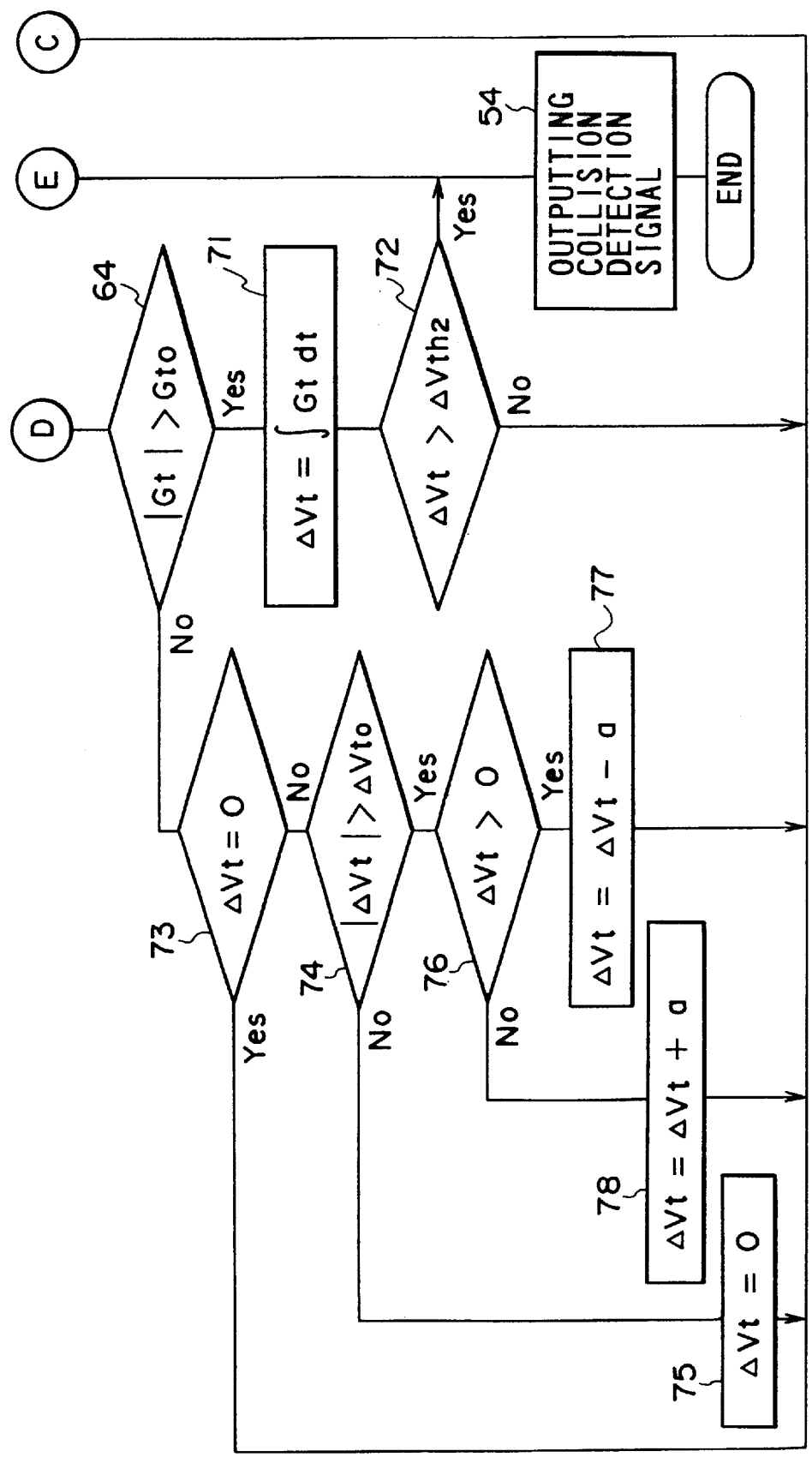

FIG. 3, FIG. 4 and FIG. 5 are flow diagrams of the microcomputer 2 of the control unit 1 in FIG. 1. Terminals A and B of FIG. 4 are connected to terminals having the same signs A and B of FIG. 3, and terminals C, D and E of the FIG. 5 are connected to terminals having the same signs C, D and E of FIG. 3 and FIG. 4.

When a power source is applied by turning on an ignition switch (not shown in the drawings) of the vehicle, the microcomputer 2 of the control unit 1 starts the control processing according to the flow diagrams, and enters a step 51 after an initialization in a step 50.

In the step 51, the microcomputer 2 inputs an acceleration signal Gf1 of the first front acceleration sensor 6, and decides whether an absolute value of the acceleration signal Gf1 is larger than a front reference value Gfo. The front reference value Gfo is a reference value for deciding whether the acceleration signal Gf1 and an acceleration signal Gf2 are integrated. As described below, the acceleration signal Gf2 is the sensor output of the second front acceleration sensor 7. The front reference value Gfo is set so that an integration of the acceleration signals Gf1 and Gf2 is not performed against a non-collision acceleration of the vehicle occurring by a sudden braking and so on. In the step 51, when the absolute value of the acceleration signal Gf1 is larger than the front reference value Gfo, the microcomputer 2 enters from the step 51 to a step 52 and computes an integrated value $\Delta Vf1$ of the acceleration signal Gf1. In a following step 53, the microcomputer 2 decides whether the integrated value $\Delta Vf1$ of the acceleration signal Gf1 is larger than a front threshold value $\Delta Vth1$. The front threshold value $\Delta Vth1$ is a threshold value for deciding whether the vehicle is in the collision requiring the drive of the occupant protection device 9, and is a threshold value in relation to the integrated value $\Delta Vf1$ and an integrated value $\Delta Vf2$. As described below, the integrated value $\Delta Vf2$ is an integrated value of the acceleration signal Gf2 of the second front acceleration sensor 7. When the integrated value $\Delta Vf1$ of the first front acceleration sensor 6 is larger than the front threshold value $\Delta Vth1$, the microcomputer 2 enters from the step 53 to a step 54 of FIG. 5, outputs the collision detection signal to the drive circuit 5, and finishes the control processing. When the integrated value $\Delta Vf1$ is not larger than the front threshold value $\Delta Vth1$ in the step 53, the microcomputer 2 enters a step 55 of FIG. 4. The drive circuit 5, when the collision detection signal is provided from the microcomputer 2, outputs the drive signal to the occupant protection device 9, and thereby the occupant protection device 9 such as the airbag is driven.

On the other hand, when the absolute value of the acceleration signal Gf1 of the first front acceleration sensor 6 is not larger than the front reference value Gfo in the step 51, the microcomputer 2 enters a reset processing of steps 56–61, and goes to the step 55 of FIG. 4 after the reset processing. In the step 56 of the reset processing, whether the integrated value $\Delta Vf1$ of the first front acceleration sensor 6 is "0" is decided. If the absolute value of the acceleration signal Gf1 of the first front acceleration sensor 6 has not exceeded the front reference value Gfo yet after starting the control processing, the integrated value $\Delta Vf1$ is the initial value namely "0". Accordingly, the microcomputer 2 directly enters from the step 56 to the step 55 of FIG. 4. When the integrated value $\Delta Vf1$ is not "0" in the step 56, the microcomputer 2 enters the step 57 and decides whether the absolute value of the integrated value $\Delta Vf1$ is larger than the front reset reference value $\Delta Vfo$. The front reset reference value $\Delta Vfo$ is a reference value for deciding whether the integrated value $\Delta Vf1$ of the first front acceleration sensor 6 and the integrated value $\Delta Vf2$ of the second front acceleration sensor 7 are reset to "0". In this embodiment, the front reset reference value $\Delta Vfo$ is set as $a<\Delta Vfo<2a$. "a" is a subtraction value described below. When the absolute value of the integrated value $\Delta Vf1$ of the first front acceleration sensor 6 is not larger than the front reset reference value $\Delta Vfo$, the microcomputer 2 enters from the step 57 to the step 58, resets the integrated value $\Delta Vf1$ to "0", and enters the step 55 of FIG. 4. When the absolute value of the integrated value $\Delta Vf1$ is larger than the front reset reference value $\Delta Vfo$, the microcomputer 2 enters from the step 57 to the step 59 and decides whether the integrated value $\Delta Vf1$ is larger than "0". When the integrated value $\Delta Vf1$ is larger than "0" in the step 59, the subtraction value "a" is subtracted from the integrated value $\Delta Vf1$ in the step 60. When the integrated value $\Delta Vf1$ is not larger than "0" in the step 59, the subtraction value "a" is added to the integrated value $\Delta Vf1$ in the step 61. Thereafter, the microcomputer 2 enters the step 55 of FIG. 4. Since the acceleration signals Gf1 and Gf2 of the first and second front acceleration sensors 6 and 7 fluctuate by resonance and so on, the acceleration signals Gf1 and Gf2 may temporally become smaller than the front reference value Gfo after they becoming larger than the value Gfo while detecting a collision acceleration. In such a case, in this embodiment, a prior integrated value is not immediately reset to "0", but it is processed gradually toward the rest direction by means of the subtraction value "a". Because of this, when the acceleration signals Gf1 and Gf2 exceed the front reference value Gfo again, the integral processing can be continued from the prior integrated value, and thereby collision detection can be performed quickly.

In the step 55 of FIG. 4, the microcomputer 2 inputs the acceleration signal Gf2 of the second front acceleration sensor 7, and decides whether the absolute value of the acceleration signal Gf2 is larger than the front reference value Gfo. In the step 55, when the absolute value of the acceleration signal Gf2 is larger than the front reference value Gfo, the microcomputer 2 enters a step 62 and computes the integrated value $\Delta Vf2$ of the acceleration signal Gf2. In a following step 63, the microcomputer 2 decides whether the integrated value $\Delta Vf2$ is larger than the front threshold value $\Delta Vth1$. When the integrated value $\Delta Vf2$ is larger than the front threshold value $\Delta Vth1$, the microcomputer 2 enters from the step 63 to the step 54 of FIG. 5, outputs the collision detection signal to the drive circuit 5, and finishes the control processing. When the integrated value $\Delta Vf2$ is not larger than the front threshold value $\Delta Vth1$, the microcomputer 2 enters the step 64 of FIG. 5. The drive circuit 5, when the collision detection signal is provided from the microcomputer 2, outputs the drive signal to the occupant protection device 9, and thereby the occupant protection device 9 is driven.

On the other hand, when the absolute value of the acceleration signal Gf2 of the second front acceleration sensor 7 is not larger than the front reference value Gfo in the step 55, the microcomputer 2 enters a reset processing of steps 65–70, and goes to the step 64 of FIG. 5 after the reset processing. In the reset processing of the steps 65–70, the same processing as the aforementioned reset processing of the steps 56–61 in relation to the first front acceleration sensor 6 is executed. That is, in the step 65 whether the integrated value $\Delta Vf2$ of the second front acceleration sensor 7 is "0" is decided, and the microcomputer 2 directly enters from the step 65 to the step 64 of FIG. 5 when the integrated value $\Delta Vf2$ is "0". When the integrated value $\Delta Vf2$ is not "0" in the step 65, the microcomputer 2 enters the step 66. In the step 66, whether the absolute value of the integrated value $\Delta Vf2$ is larger than the front reset reference value $\Delta Vfo$ is decided. When the absolute value of the integrated value $\Delta Vf2$ is not larger than the front reset reference value $\Delta Vfo$, the microcomputer 2 resets the integrated value $\Delta Vf2$ to "0" in the step 67, and enters the step 64 of FIG. 5. When the absolute value of the integrated value $\Delta Vf2$ is larger than the front reset reference value $\Delta Vfo$, the microcomputer 2 enters from the step 66 to the step 68 and decides whether the integrated value $\Delta Vf2$ is larger than "0". When the integrated value $\Delta Vf2$ is larger than "0", the subtraction value "a" is subtracted from the integrated value $\Delta Vf2$ in the step 69. When the integrated value $\Delta Vf2$ is not larger than "0", the subtraction value "a" is added to the integrated value $\Delta Vf2$ in the step 70. Thereafter, the microcomputer 2 enters the step 64 of FIG. 5.

In the step 64 of FIG. 5, the microcomputer 2 inputs an acceleration signal Gt of the room acceleration sensor 8, and decides whether the absolute value of the acceleration signal Gt is larger than a room reference value Gto. The room reference value Gto is a reference value for deciding whether the acceleration signal Gt of the room acceleration sensor 8 is integrated. The room reference value Gto is set so that an integration of the acceleration signal Gt is not performed against a non-collision acceleration of the vehicle occurring by a sudden braking and so on. In the step 64, when the absolute value of the acceleration signal Gt is larger than the room reference value Gto, the microcomputer 2 enters a step 71 and computes the integrated value $\Delta Vt$ of the acceleration signal Gt. In a following step 72, the microcomputer 2 decides whether the integrated value $\Delta Vt$ is larger than the room threshold value $\Delta Vth2$. The room threshold value $\Delta Vth2$ is a threshold value for deciding whether the vehicle is in the collision requiring the drive of the occupant protection device 9, and is a threshold value in relation to the integrated value $\Delta Vt$ of the room acceleration sensor 8. The room threshold value $\Delta Vth2$ and the aforementioned front threshold value $\Delta Vth1$ are set experimentally based on a collision requiring the drive of the occupant protection device 9 and a collision not requiring its drive. In the step 72, when the integrated value $\Delta Vt$ of the room acceleration sensor 8 is larger than the room threshold value $\Delta Vth2$, the microcomputer 2 enters the step 54, outputs the collision detection signal to the drive circuit 5, and finishes the control processing. When the integrated value $\Delta Vt$ is not larger than the room threshold value $\Delta Vth2$ in the step 72, the microcomputer 2 returns to the step 51 of FIG. 3. The drive circuit 5, when the collision detection signal is provided from the microcomputer 2, outputs the drive signal to the occupant protection device 9, and thereby the occupant protection device 9 is driven.

On the other hand, when the absolute value of the acceleration signal Gt of the room acceleration sensor 8 is not larger than the room reference value Gto in the step 64, the microcomputer 2 enters a reset processing of steps 73–78, and returns to the step 51 of FIG. 3 after the reset processing. In the reset processing of the steps 73–78, the same processing as the aforementioned reset processing of the steps 56–61 in relation to the first front acceleration sensor 6 is executed. That is, in the step 73 whether the integrated value $\Delta Vt$ of the room acceleration sensor 8 is "0" is decided, and the microcomputer 2 directly returns to the step 51 of FIG. 3 when the integrated value $\Delta Vt$ is "0". When the integrated value $\Delta Vt$ is not "0" in the step 73, the microcomputer 2 enters the step 74. In the step 74, whether the absolute value of the integrated value $\Delta Vt$ is larger than a room reset reference value $\Delta Vto$ is decided. When the absolute value of the integrated value $\Delta Vt$ is not larger than the room reset reference value $\Delta Vto$, the microcomputer 2 resets the integrated value $\Delta Vt$ to "0" in the step 75, and returns the step 51 of FIG. 3. When the absolute value of the integrated value $\Delta Vt$ is larger than the room reset reference value $\Delta Vto$, the microcomputer 2 enters from the step 74 to the step 76. The room reset reference value $\Delta Vto$ is a reference value for deciding whether the integrated value $\Delta Vt$ of the room acceleration sensor 8 is reset to "0", and this is set likewise the aforementioned front reset reference value $\Delta Vfo$. In the step 76, whether the integrated value $\Delta Vt$ is larger than "0". When the integrated value $\Delta Vt$ is larger than "0", the subtraction value "a" is subtracted from the integrated value $\Delta Vt$ in the step 77. When the integrated value $\Delta Vt$ is not larger than "0", the subtraction value "a" is added to the integrated value $\Delta Vt$ in the step 78. Thereafter, the microcomputer 2 returns the step 51 of FIG. 3.

According to the above embodiment, whether the vehicle is in the collision requiring the drive of the occupant protection device 9 is decided based on the sensor outputs of the room acceleration sensor, the first front acceleration sensor 6 and the second front acceleration sensor 7, respectively. When the collision is detected based on the sensor output of any of the acceleration sensor 6, 7 and 8, the occupant protection device 9, like an airbag and a seat-belt tensioner, is driven. The first and second front acceleration sensors 6 and 7, as described above, are provided at the right and left sides of the front part of the vehicle. Because of this, even in case of a collision, such as an oblique or offset collision, in which the collision acceleration transmitted to the room acceleration sensor 8 provided on the floor tunnel may be weakened, the first and/or second front acceleration sensors 6 and 7 can detect the collision acceleration early and give it to the control unit 1. Therefore, the control unit 1 can exactly drive the occupant protection device 9, without causing any delay in collision detection.

A sensitivity of the first and second front acceleration sensors 6 and 7 can easily be changed by changing the front threshold value $\Delta Vth1$. Therefore, a sensitivity adjustment according to car types and so on is easy, and a dispersion in sensitivity can also be reduced.

Figure 6:
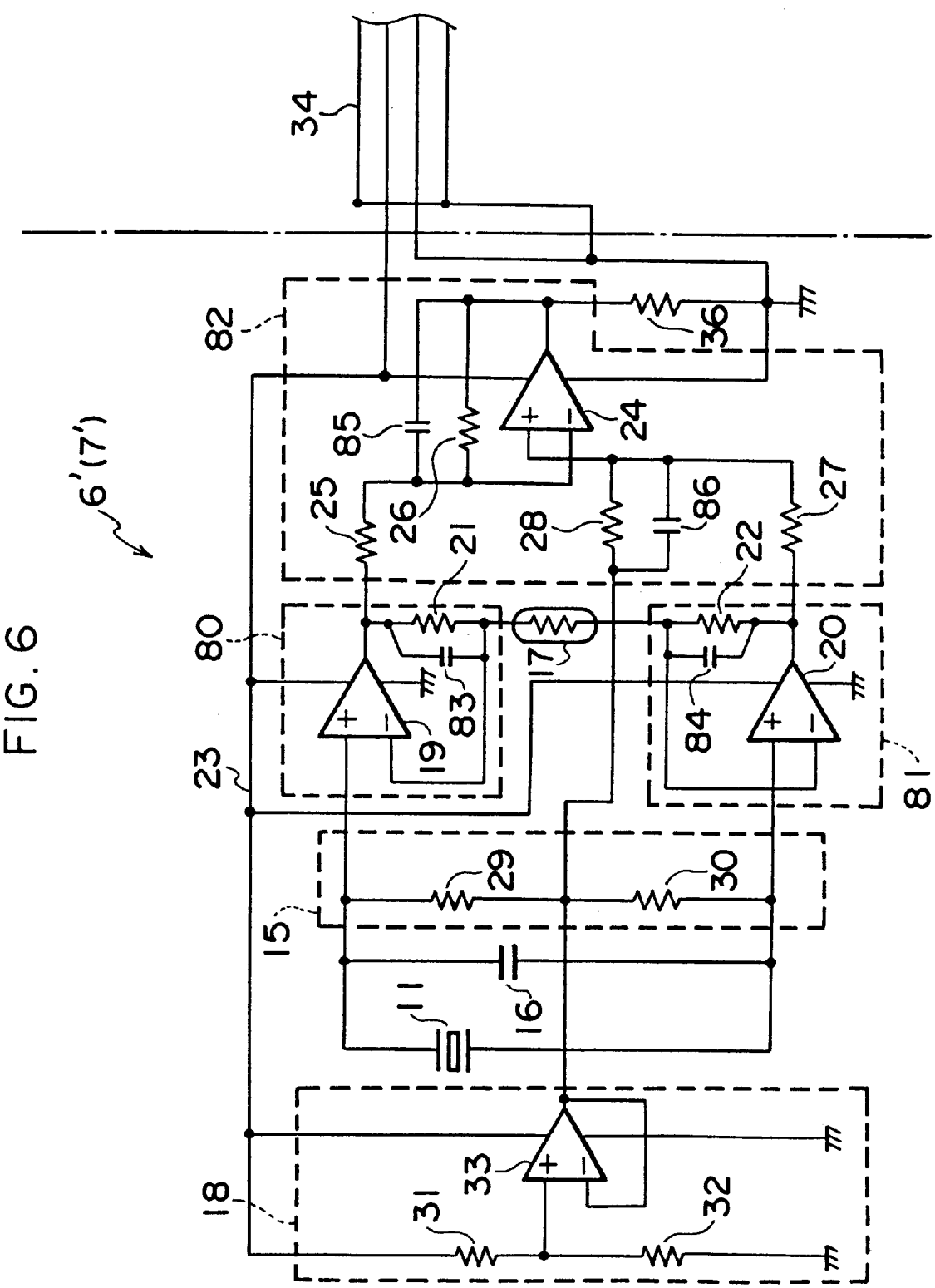
FIG. 6 is a circuit diagram showing another example of the first and second front acceleration sensors in FIG. 1.
Figure 7:
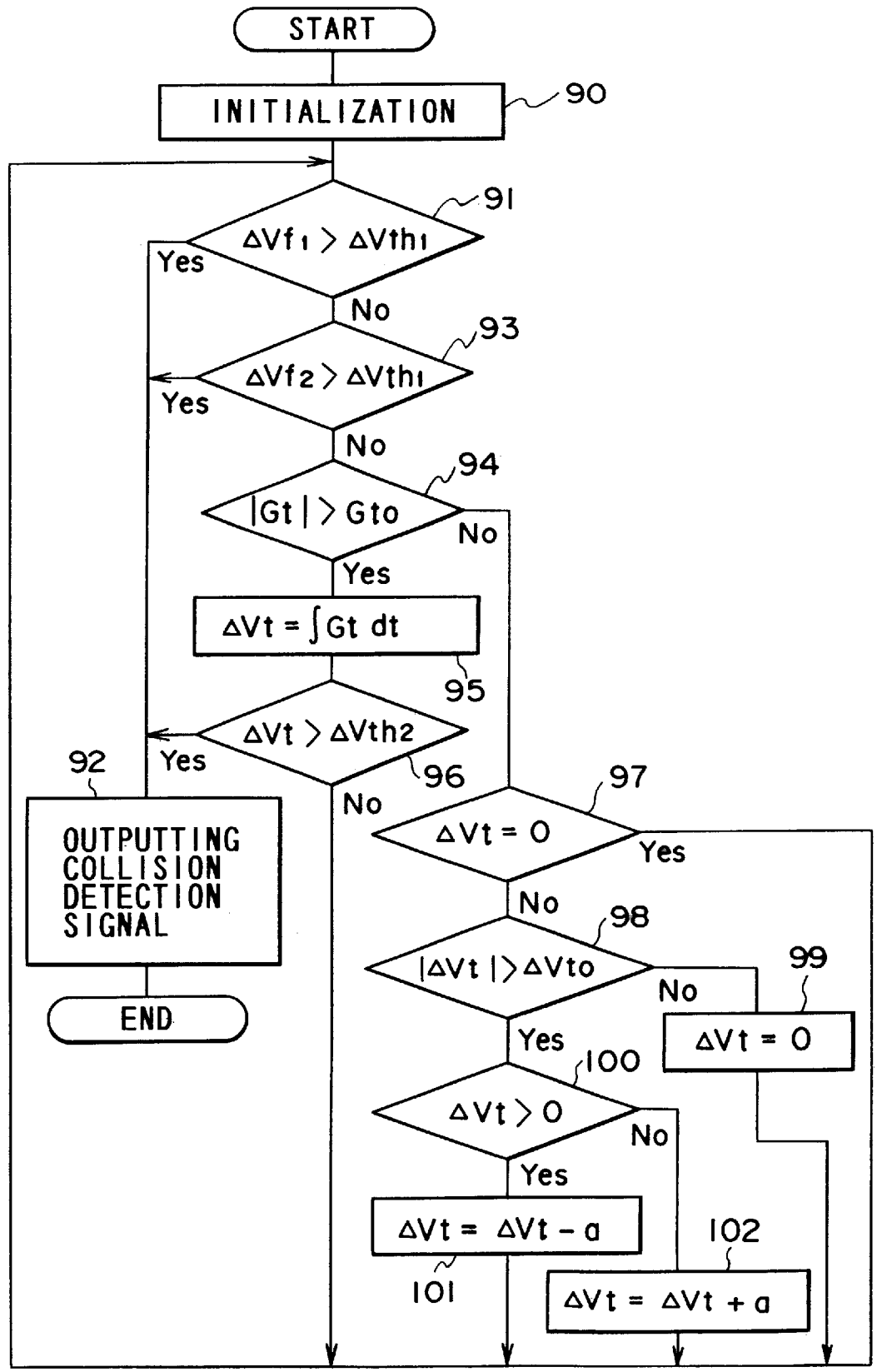
FIG. 7 is a flow diagram of the microcomputer of the control unit of FIG. 1 showing another embodiment of the present invention, and this is the flow diagram in the case in which the first and second front acceleration sensors of FIG. 6 are used.

FIG. 6 is a circuit diagram showing another example of the first and second front acceleration sensors in FIG. 1. In FIG. 6, components that are given the same reference numerals as those of FIG. 2 indicate the same. FIG. 7 is a flow diagram of the microcomputer 2 of FIG. 1 showing another embodiment. FIG. 7 shows the flow diagram in the case in which the first and second front acceleration sensors of FIG. 6 are used, and this is applied to the microcomputer 2 in place of the flow diagrams of FIG. 3, FIG. 4 and FIG. 5.

In FIG. 6, a reference numeral 6' (7') is a first (second) front acceleration sensor. The first (second) front acceleration sensor 6' (7') is applied to the composition of FIG. 1 instead of the first (second) front acceleration sensor 6 (7) of FIG. 2. In the front acceleration sensor 6' (7'), an amplifier circuit has first and second non-inverting amplifier circuit 80 and 81 with integrating functions and a differential amplifier circuit 82 with an integrating function. By this, the front acceleration sensor 6' (7') outputs an integrated value of an acceleration signal as a sensor output. The first and second non-inverting amplifier circuits 80 and 81 have condensers 83 and 84 each inserted in parallel with the resistors 21 and 22, in addition to the composition of the first and second non-inverting amplifier circuits 12 and 13 of FIG. 2. The differential amplifier circuit 82 has condensers 85 and 86 each inserted in parallel with the resistors 26 and 28, in addition to the composition of the differential amplifier circuit 14 of FIG. 2. According to a composition like this, the integrated value of an acceleration signal, as the sensor output, are given from the first (second) front acceleration sensor 6' (7') to the microcomputer 2 of FIG. 1. In this example, composition and operation of other portions is as described in relation to FIG. 2.

The microcomputer 2 of the control unit 1, when the flow diagram of FIG. 7 is started, enters a step 91 after an initialization of a step 90. In the step 91, the microcomputer 2 inputs an integrated value $\Delta Vf1$ of an acceleration signal from the first front acceleration sensor 6', and decides whether the integrated value $\Delta Vf1$ is larger than the front threshold value $\Delta Vth1$. When the integrated value $\Delta Vf1$ is larger than the front threshold value $\Delta Vth1$, the microcomputer 2 outputs the collision detection signal to the drive circuit 5 in a step 92, and finishes the control processing. When the integrated value $\Delta Vf1$ is not larger than the front threshold value $\Delta Vth1$, the microcomputer 2 enters a step 93. In the step 93, the microcomputer 2 inputs an integrated value $\Delta Vf2$ of an acceleration signal from the second front acceleration sensor 7', and decides whether the integrated value $\Delta Vf2$ is larger than the front threshold value $\Delta Vth1$. When the integrated value $\Delta Vf2$ is larger than the front threshold value $\Delta Vth1$, the microcomputer 2 outputs the collision detection signal to the drive circuit 5 in the step 92, and finishes the control processing. When the integrated value $\Delta Vf2$ is not larger than the front threshold value $\Delta Vth1$, the microcomputer 2 enters a step 94.

In the step 94, the microcomputer 2 inputs the acceleration signal Gt of the room acceleration sensor 8, and decides whether the absolute value of the acceleration signal Gt is larger than the room reference value Gto. When the absolute value of the acceleration signal Gt is larger than the room reference value Gto, the microcomputer 2 computes the integrated value $\Delta Vt$ of the acceleration signal Gt in a step 95, and decides in a following step 96 whether the integrated value $\Delta Vt$ is larger than the room threshold value $\Delta Vth2$. When the integrated value $\Delta Vt$ of the room acceleration sensor 8 is larger than the room threshold value $\Delta Vth2$, the microcomputer 2 enters from the 96 to the step 92, outputs the collision detection signal to the drive circuit 5, and finishes the control processing. When the integrated value $\Delta Vt$ is not larger than the room threshold value $\Delta Vth2$, the microcomputer 2 returns to the step 91.

On the other hand, when the absolute value of the acceleration signal Gt of the room acceleration sensor 8 is not larger than the room reference value Gto in the step 94, the microcomputer 2 enters a reset processing of steps 97–102, and returns to the step 91 after the reset processing. In the reset processing of the steps 97–102, the same processing as the reset processing of the steps 73–78 of FIG. 5 is executed.

According to the above embodiment, since the microcomputer 2 of the control unit 1 does not need to perform integration and reset processing in relation to the sensor outputs of the first and second front acceleration sensors 6' and 7', simplification of composition as well as an improvement in processing speed can be achieved. Moreover, if the room acceleration sensor 8 is designed to output an integrated value of acceleration like the front acceleration sensors 6' and 7', further simplification of composition and a further improvement in processing speed can be expected.

Although in the example of FIG. 6 the first and second non-inverting amplifier circuits 80 and 81 and the differential amplifier circuit 82 each have the integrating function, either the first and second non-inverting amplifier circuits 80 and 81 or the differential amplifier circuit 82 may have the integrating function.

Although two front acceleration sensors are used in each of the embodiments mentioned above, this is not intended to limit the scope of the invention. The number of front acceleration sensors can be one, or more than two. When only one front acceleration sensor is used, it is desirable that the front acceleration sensor is provided in a center part of a vehicle front where an impact of collision can easily be absorbed, for example, near a radiator like a center part of a radiator mount holding a radiator. Since such a part is relatively soft in a car body, a collision impact can easily be absorbed and transmission of a collision acceleration to the floor tunnel of vehicle tends to be weakened. When the front acceleration sensor is provided in such a part, in case of a collision in which transmission of the collision acceleration to the floor tunnel is weakened, for example, a center pole collision in which a center part of a car front collides against a pole such as an electric light pole, and an under-ride collision in which a car front goes under a back part of a truck and so on, the collision acceleration can be detected early. It goes without saying that the front acceleration sensor attached as mentioned above can be included in each of the embodiments of the present invention.

From foregoing it will now be apparent that a new and improved control apparatus of an occupant protection device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A control apparatus of an occupant protection device having a room acceleration sensor, provided in a room of a vehicle, for detecting an acceleration of the vehicle, comprising:

at least one front acceleration sensor, provided in a front part of the vehicle, for detecting the acceleration of the vehicle, said front acceleration sensor including
   a piezo-electric element for detecting the acceleration,
   an amplifier circuit for inputting voltage outputs of both ends of said piezo-electric element, and for outputting an acceleration signal as a sensor output by differentially amplifying the voltage outputs of said piezo-electric element, said amplifier circuit including a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits,
   a bias resistor circuit provided at an input side of said amplifier circuit,
   a condenser inserted in parallel with said piezo-electric element in order to lower a lower cut-off frequency without increasing resistance values of said bias resistor circuit,
   temperature compensation means for adjusting a gain of said amplifier circuit so that an output-temperature characteristic of said piezo-electric element is compensated,
   a reference voltage circuit for giving a reference potential to said amplifier circuit and said bias resistor circuit; and
a control unit, connected to said room acceleration sensor and said front acceleration sensor, for inputting a sensor output of said room acceleration sensor and the sensor output of said front acceleration sensor, for deciding whether the vehicle is in a collision requiring a drive of the occupant protection device based on each of the sensor outputs of said room acceleration sensor and said front acceleration sensor, respectively, and for driving the occupant protection device when the collision is detected based on the sensor output from said room acceleration sensor or said at least one front acceleration sensor.

2. The control apparatus of claim 1, wherein said front acceleration sensor is provided near a radiator located at a center part of the front part of the vehicle.

3. The control apparatus of claim 1, wherein a capacity of said condenser is set so that resistors of said bias resistor circuit have values that can be used in a normal atmosphere and so that the lower cut-off frequency have a low value in which velocity variations can easily be detected.

4. The control apparatus of claim 1, wherein said temperature compensation means comprises a single temperature compensation element for adjusting gains of said first and second non-inverting amplifier circuits.

5. The control apparatus of claim 4, wherein:
   said first non-inverting amplifier circuit comprises a first operational amplifier, one input terminal of the first operational amplifier being connected to one end of said piezo-electric element, and the other input terminal of the first operational amplifier being connected through a first resistor to an output terminal of the first operational amplifier;
   said second non-inverting amplifier circuit comprises a second operational amplifier, one input terminal of the second operational amplifier being connected to the other end of said piezo-electric element, and the other input terminal of the second operational amplifier being connected through a second resistor to an output terminal of the second operational amplifier; and
   said temperature compensation element is inserted between the other input terminal of the first operational amplifier and the other input terminal of the second operational amplifier, and decreases the gains of the first and second operational amplifiers when temperature rises and increases these gains when temperature drops.

6. The control apparatus of claim 5, wherein the first and second resistors are set so that decrement in the voltage outputs of said piezo-electric element due to the parallel insertion of said condenser to said piezo-electric element can be supplemented by the gains of the first and second non-inverting amplifier circuits.

7. The control apparatus of claim 1, wherein:
   said differential amplifier circuit comprises an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit, and
   said reference voltage circuit has a reference voltage buffer amplifier for matching with output impedances of said first and second non-inverting amplifier circuits, and supplies the reference potential to at least said differential amplifier circuit by way of the reference voltage buffer amplifier.

8. The control apparatus of claim 1, wherein:
   said front acceleration sensor comprises a sensor power supply line to which a constant voltage is supplied from an outside, an output terminal of said amplifier circuit of said front acceleration sensor is grounded by way of an output resistor, and the acceleration signal of said front acceleration sensor is output as current variations in the sensor power supply line; and
   said control unit includes a unit power supply line for supplying the constant voltage to the sensor power supply line by way of a transmission cable, and at least one receiving circuit for receiving the acceleration signal of said front acceleration sensor by detecting the current variations in the unit power supply line.

9. The control apparatus of claim 8, wherein the receiving circuit comprises:
   a current mirror circuit, inserted between the unit power supply line and the transmission cable, for giving a current output according to the current variations representative of the acceleration signal of said front acceleration sensor; and a detection resistor, inserted between an output side of the current mirror circuit and the ground, for outputting a voltage signal corresponding to the current output of the current mirror circuit.

10. The control apparatus of claim 1, wherein:
said control unit comprises a front reference value for deciding whether the acceleration signal of said front acceleration sensor is integrated;
said control unit integrates the acceleration signal of said front acceleration sensor when the acceleration signal of said front acceleration sensor is larger than the front reference value, and decides whether the vehicle is in the collision based on a comparison between an integrated value of the acceleration signal and a predetermined front threshold value; and
said control unit, when the acceleration signal of said front acceleration sensor is smaller than the front reference value, processes the integrated value of the acceleration signal of said front acceleration sensor gradually toward a reset direction.

11. A control apparatus of an occupant protection device having a room acceleration sensor, provided in a room of a vehicle for detecting an acceleration of the vehicle, comprising:
at least one front acceleration sensor, provided in a front part of the vehicle for detecting the acceleration of the vehicle, said front acceleration sensor including
a piezo-electric element for detecting the acceleration,
an amplifier circuit for inputting voltage outputs of both ends of said piezo-electric element, for differentially amplifying and integrating the voltage outputs of said piezo-electric element, and for outputting an integrated value of an acceleration signal as the sensor output,
a bias resistor circuit provided at an input side of said amplifier circuit,
a condenser inserted in parallel with said piezo-electric element in order to lower a lower cut-off frequency without increasing resistance values of said bias resistor circuit,
temperature compensation means for adjusting a gain of said amplifier circuit so that an output-temperature characteristic of said piezo-electric element is compensated, and
a reference voltage circuit for giving a reference potential to said amplifier circuit and said bias resistor circuit; and
a control unit, connected to said room acceleration sensor and said front acceleration sensor, for inputting a sensor output of said room acceleration sensor and the sensor output of said front acceleration sensor, for deciding whether the vehicle is in a collision requiring a drive of the occupant protection device based on each of the sensor outputs of said room acceleration sensor and said front acceleration sensor, respectively, and for driving the occupant protection device when the collision is detected based of the sensor output from said room acceleration sensor or said at least one front acceleration sensor.

12. The control apparatus of claim 11, wherein a capacity of said condenser is set so that resistors of said bias resistor circuit have values that can be used in a normal atmosphere and so that the lower cut-off frequency has a low value in which velocity variations can easily be detected.

13. The control apparatus of claim 11, wherein:
said amplifier circuit comprises a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits, said first and second non-inverting amplifier circuits and/or said differential amplifier circuit having an integrating function; and
said temperature compensation means includes a single temperature compensation element for adjusting gains of said first and second non-inverting amplifier circuits.

14. The control apparatus of claim 13, wherein:
said first non-inverting amplifier circuit comprises a first operational amplifier, one input terminal of the first operational amplifier being connected to one end of said piezo-electric element, and the other input terminal of the first operational amplifier being connected to an output terminal of the first operational amplifier by way of a parallel connection of a first resistor and a first condenser;
said second non-inverting amplifier circuit comprises a second operational amplifier, one input terminal of the second operational amplifier being connected to the other end of said piezo-electric element, and the other input terminal of the second operational amplifier being connected to an output terminal of the second operational amplifier byway of a parallel connection of a second resistor and a second condenser; and
said temperature compensation element is inserted between the other input terminal of the first operational amplifier and the other input terminal of the second operational amplifier, and decreases the gains of the first and second operational amplifiers when temperature rises and increases these gains when temperature drops.

15. The control apparatus of claim 13, wherein said differential amplifier circuit comprises a third operational amplifier, one input terminal of the third operational amplifier being connected to an output terminal of said second non-inverting amplifier circuit byway of a third resistor and being connected to said reference voltage circuit byway of a parallel connection of a fourth resistor and a third condenser, and the other input terminal of the third operational amplifier being connected to an output terminal of said first non-inverting amplifier circuit byway of a fifth resistor and being connected to an output terminal of the third operational amplifier by way of a parallel connection of a sixth resistor and a fourth condenser.

16. The control apparatus of claim 13, wherein the gains of said first and second non-inverting amplifier circuits are set so that decrement in the voltage outputs of said piezo-electric element due to the parallel insertion of said condenser to said piezo-electric element can be supplemented by the gains of the first and second non-inverting amplifier circuits.

17. The control apparatus of claim 13, wherein:
said differential amplifier circuit comprises an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and
said reference voltage circuit has a reference voltage buffer amplifier for matching with output impedance of said first and second non-inverting amplifier circuits, and supplies the reference potential to at least said differential amplifier circuit by way of the reference voltage buffer amplifier.

18. The control apparatus of claim 11, wherein:

said front acceleration sensor comprises a sensor power supply line to which a constant voltage is supplied from an outside, an output terminal of said amplifier circuit of said front acceleration sensor is grounded by way of an output resistor, and the integrated value of the acceleration signal from said front acceleration sensor is output as current variations in the sensor power supply line; and said control unit includes a unit power supply line for supplying the constant voltage to the sensor power supply line by way of a transmission cable, and at least one receiving circuit for receiving the integrated value of the acceleration signal from said front acceleration sensor by detecting the current variations in the unit power supply line.

19. The control apparatus of claim 18, wherein the receiving circuit comprises:

a current mirror circuit, inserted between the unit power supply line and the transmission cable, for giving a current output according to the current variations representative of the integrated value of the acceleration signal of said front acceleration sensor; and a detection resistor, inserted between an output side of the current mirror circuit and the ground, for outputting a voltage signal corresponding to the current output of the current mirror circuit.

20. The control apparatus of claim 11, wherein said control unit decides whether the vehicle is in the collision based on a comparison between the integrated value of acceleration from said front acceleration sensor and a predetermined front threshold value.

21. The control apparatus of claim 1 or 11, wherein said front acceleration sensor is provided near a right and a left portion of a radiator located at the front part of the vehicle, respectively.

* * * * *